United States Patent
Arsem

[11] 3,879,730
[45] Apr. 22, 1975

[54] RANGE TRACKING CIRCUIT
[75] Inventor: A. Donald Arsem, Liverpool, N.Y.
[73] Assignee: Radio Corporation of America, Princeton, N.J.
[22] Filed: Oct. 19, 1949
[21] Appl. No.: 122,233

[52] U.S. Cl. .............................................. 343/7.3
[51] Int. Cl. ............................................. G01s 9/14
[58] Field of Search .................................. 343/7.3

[56] References Cited
UNITED STATES PATENTS

| | | | |
|---|---|---|---|
| 2,444,426 | 7/1948 | Busignies | 250/27 GT |
| 2,461,456 | 2/1949 | Usselman | 250/27 GT |
| 2,467,208 | 4/1949 | Hahn | 343/7 |
| 2,468,703 | 4/1949 | Hammel | 343/7 |
| 2,495,753 | 1/1950 | Mozley | 343/11 |
| 2,538,027 | 1/1951 | Mozley et al. | 343/7 |
| 2,543,072 | 2/1951 | Stearns | 343/13 |
| 2,569,485 | 10/1951 | McLennan | 343/7 |
| 2,708,750 | 5/1955 | Oliver | 343/7.3 |
| 3,041,602 | 6/1962 | Rubin | 343/7.3 |

Primary Examiner—T. H. Tubbesing
Attorney, Agent, or Firm—Edward J. Norton

EXEMPLARY CLAIM

2. A pulse-echo distance determining system comprising means for transmitting a succession of pulses at a recurring frequency, means for receiving said pulses after reflection from a distant object, said receiving means consisting of a single channel that includes a gating circuit, means for producing gating pulses that recur at the same repetition rate as the received pulses but which have alternate pulses starting late in the gating pulse repetition cycle whereby there are produced early gating pulses that have a repetition rate equal to one-half the repetition rate of said received pulses and late gating pulses that have a repetition rate equal to one-half the repetition rate of said received pulses; means for applying said gating pulses to said gating circuit whereby received pulses reflected from said object appear in the output circuit of the receiving means when said received pulses and said gating pulses occur simultaneously or overlap in time, means for obtaining a control voltage that is a function of the relative amplitudes of two successive output pulses from the receiving means, and means for shifting the phase or timing of said gating pulses as a function of said control voltage and for holding said gating pulses in an overlapped time relation with respect to the received pulses as the distance to said object changes, and means for producing an indication that is a function of the phasing of said gating pulses whereby distance to the reflecting object is indicated.

7 Claims, 5 Drawing Figures

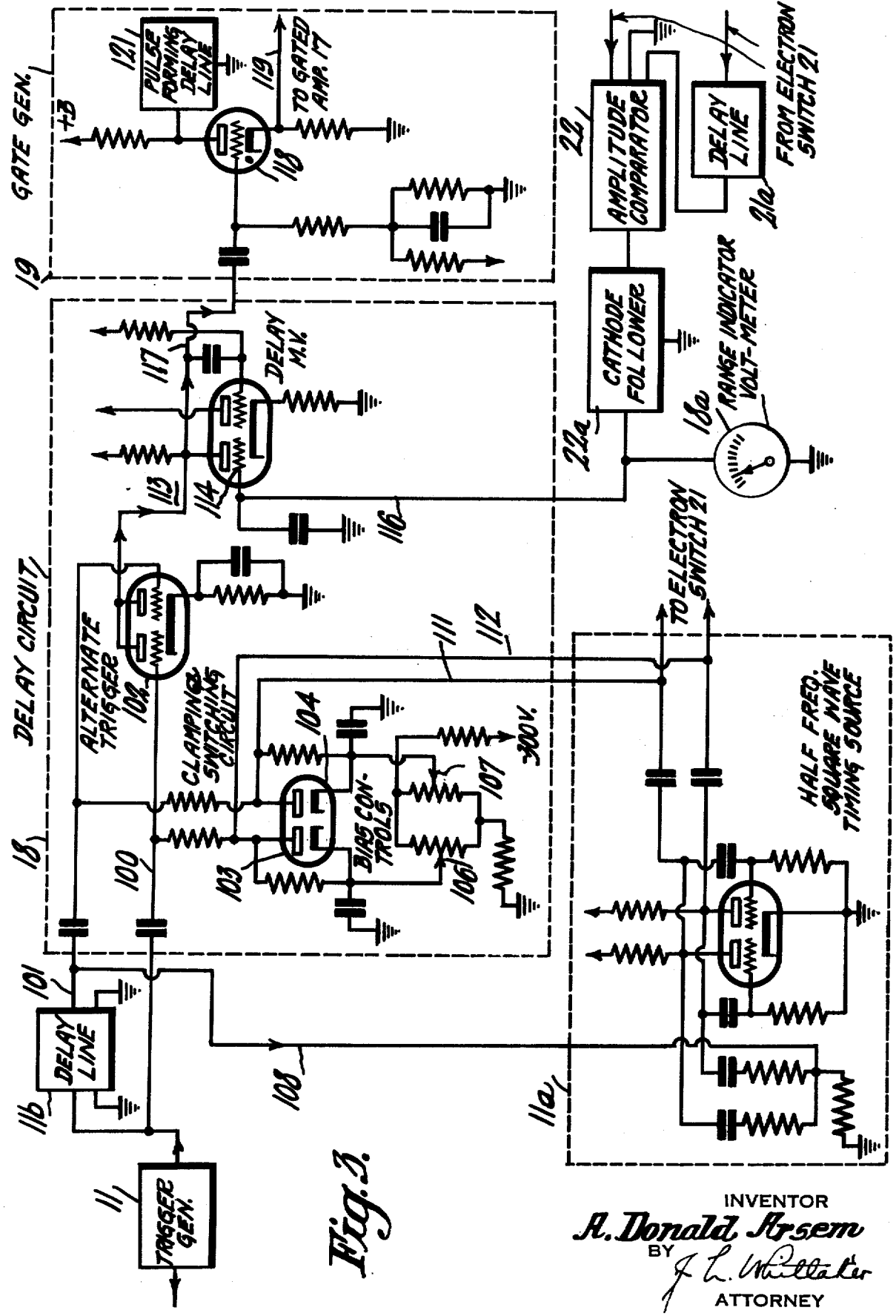

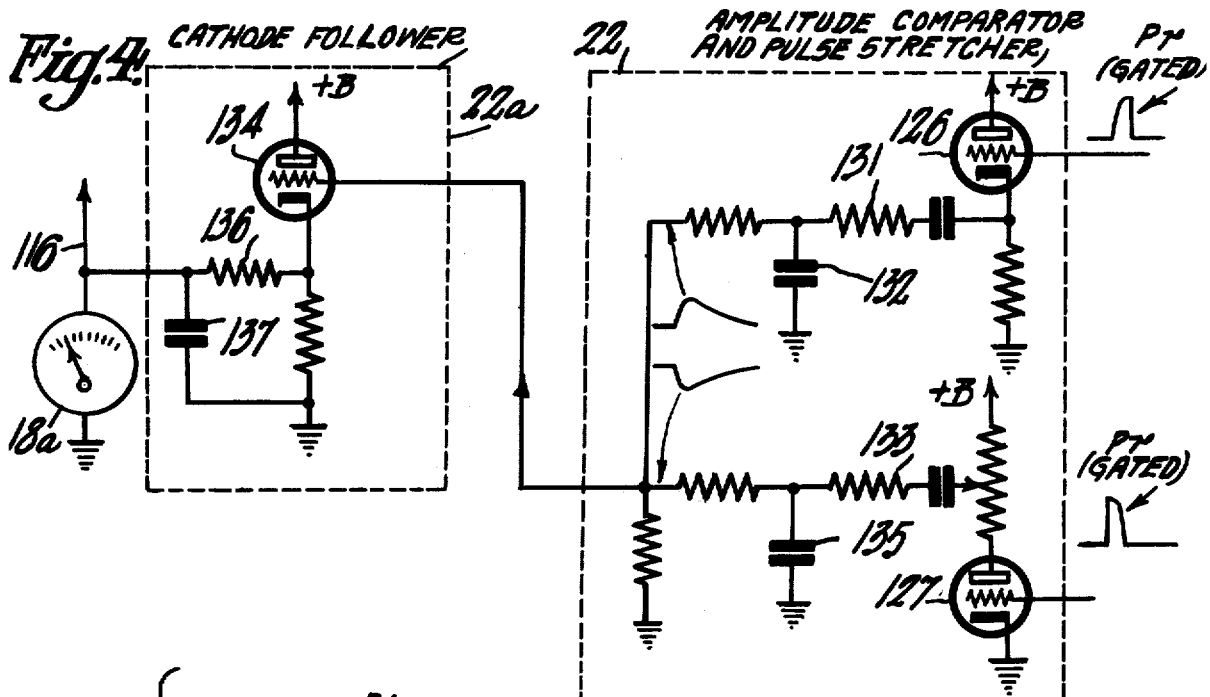
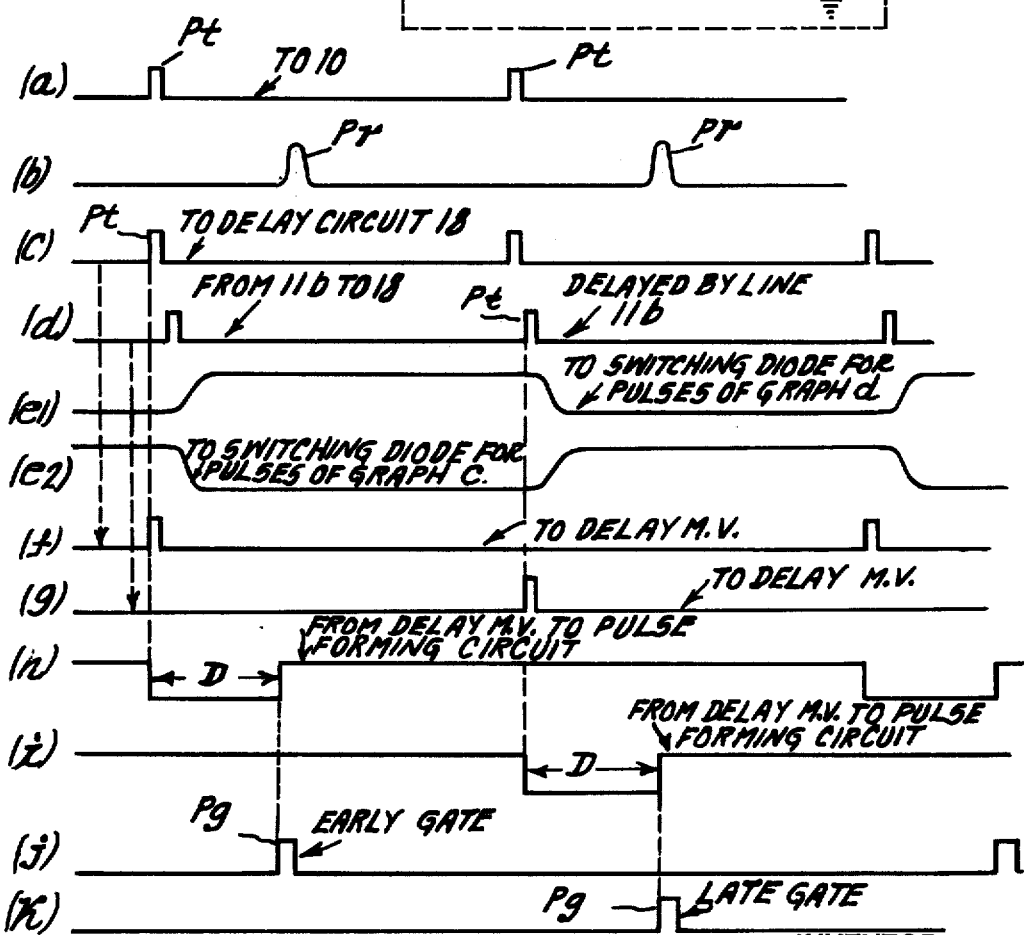

RANGE TRACKING CIRCUIT

This invention relates generally to precision control circuits for electrical systems, and more particularly to such precision control circuits for electrical metering systems designed to operate with maximum accuracy in response to the occurrences of the peaks of the wave form of the energy in the systems. The invention is particularly applicable to pulse-echo types of distance determining systems that include an automatic tracking device.

Range-finding radar systems that are designed to indicate range with a fine degree of accuracy are generally preferably made to respond to the peak of the center of the reflected incoming pulse as the width of the pulse may represent an appreciable interval of distance. More accurate range indications are obtained, therefore, when the delay circuits employed in such systems are arranged to indicate the elapsed time between the transmission of the pulses and the time of arrival of the same portion of the received pulses, generally the centers or peaks of the pulses. Variations in the time of reception of the peaks of pulses may be tracked automatically by the use of delay circuits that establish a time reference with respect to the peaks of the received pulses, so that a variation of propagation time, either shorter or longer, will upset a condition of balance in a circuit which thereupon produces an error or control potential or signal. The control potential established may be employed to adjust the delay circuit to the point where the setting of the delay circuit represents the time elapsed between the transmission of a pulse and the reception of the center or the peak of the same pulse after reflection. Since the rate of propagation of radio energy is a known constant, the elapsed time as indicated by the setting of the delay circuit may be translated into a lienar measurement, which represents the distance between the receiver and the object from which the pulse has been reflected. It is understood, of course, that the pulse transmitter and receiver are in the same immediate locality.

One of the conventional automatic tracking systems employed in connection with pulse echo distance determining systems has comprised two gated amplifiers to both of which are applied individually the reflected video signal. A gating pulse is applied to the one amplifier to sensitize it only during the interval in which the first half of the incoming video pulse is being received. This is commonly referred to as the early gate. A similar gating pulse is applied to the second amplifier to which the video pulse has also been supplied to sensitize it only during the interval when the second half of the video pulse is being received. The outputs of these amplifiers are applied to a balanced amplitude comparison circuit. If the peak of the received pulse occurs exactly halfway between the aforementioned gating instants, the amplitude of the outputs of the amplifiers will be equal and no error or control voltage will be developed by the balanced amplitude comparison circuit. However, if the pulse occurs slightly before or after a point exactly between the gate instants, the output of the amplifier toward which the pulse has moved will be larger than the output of the other amplifier and this difference will be realized in the output of the amplitude comparison circuit. The output of the amplitude comparison circuit, which will be positive or negative depending upon the direction in which the pulse has moved with respect to the mid-instant between the two gating instants, is applied to the gate positioning delay circuit to automatically re-position the mid-instant between the gating instants on the center of the incoming video pulse.

In other systems, the desired automatic matching of the delay circuit, to continuously represent the time elapsed between the transmission of a pulse and its reception in the receiver after its reflection by a particular target, is obtained by adding in a suitable mixing circuit the received pulse and a rectangular pulse having steeply sloping sides and which has a known time or phase relation to the transmitted pulse. The rectangular pulse is added to the mixer through a variable-delay circuit by means of which a selected reflected pulse can be imposed on one of the steep sides of the rectangular pulse. The reflected pulses are also mixed in a separate circuit with a similar rectangular pulse of a polarity reversed as to the first pulse but in the same phase. The same delay circuit is employed to adjust the phase of both of the aforementioned rectangular pulses so that the received pulse may be imposed upon the steeply sloping sides of both rectangular pulses. The output of the two separate mixing circuits is supplied to an amplitude comparison circuit that develops a control voltage which may be employed to re-position the occurrence of the steeply sloping sides with respect to the reflected pulse. As the object, from which a particular series of pulses have been reflected, moves either toward or away from the receiver, the pulses will be displaced upwardly along the steeply sloping side of the rectangular pulse of one polarity, and downwardly along the steeply sloping side of the pulse of opposite polarity. This results in the output of the one mixing circuit being increased in amplitude and the output of the other mixing circuit being simultaneously decreased in amplitude. The difference in amplitude output is resolved in an amplitude comparison circuit and appears as a control voltage having a negative or positive polarity depending on the direction in which the pulses have been displaced. The control voltage thus developed is applied to the delay circuit to re-position the steeply sloping sides of the rectangular pulse with respect to the received pulse so that the amplitudes of the output of the two mixing circuits are again equal and the control voltage is reduced to zero. The change thus effected in the delay circuit to restore the system to balance is a function of the distance the reflecting object has moved either toward or away from the receiver and is generally realized by the system as an appropriate adjustment of a direct reading distance indicator.

In systems such as those described above, the control voltage, representing the correction to be applied to the delay circuit as the reflecting object moves relative to the receiver, is obtained in part by matching the amplitudes of pulses that have been diverted through entirely separate circuits prior to the matching. It is evident, therefore, that variations in gain between the separate circuits through which the pulses have been diverted will cause a control voltage to be developed and a correction to be made to the delay circuit when no actual error exists in the setting of the delay circuit with respect to the occurrence of the center or peak of the pulse.

It is one of the objects of this invention to provide an electrical control circuit in which the accuracy of the response of the circuit is independent of variations in gain characteristics of various components thereof.

A further object of the invention is to provide an improved method of and means for determining and indicating the range or distance of an object.

A further object of the invention is to provide an automatic tracking system for pulse-echo type distance determining systems in which the accuracy of the tracking is independent of the gain characteristics of the component circuits of the receiver of the system. A further object of the invention is to provide an automatic tracking system in which the control voltage is obtained by the comparison of the amplitude of echo signals amplified through a single channel, whereby all signals employed in obtaining the control voltage are subjected to the same gain characteristics.

A further object of the invention is to provide a method and means of controlling an automatic tracking system in which the control voltage is obtained by a comparison of early and late gated received pulses that are amplified in a single channel, whereby all the signals utilized in obtaining the control voltage are subjected to the same gain characteristics.

Further objects and advantages of the invention will be apparent from the following description made with reference to the accompanying drawings in which similar parts are indicated by similar reference characters and in which:

FIGS. 3 and 4 are circuit diagrams of portions of the circuits shown in block diagram in FIG. 1; and FIG. 5 is a set of graphs that are referred to in explaining the circuit operation.

Figure 1:
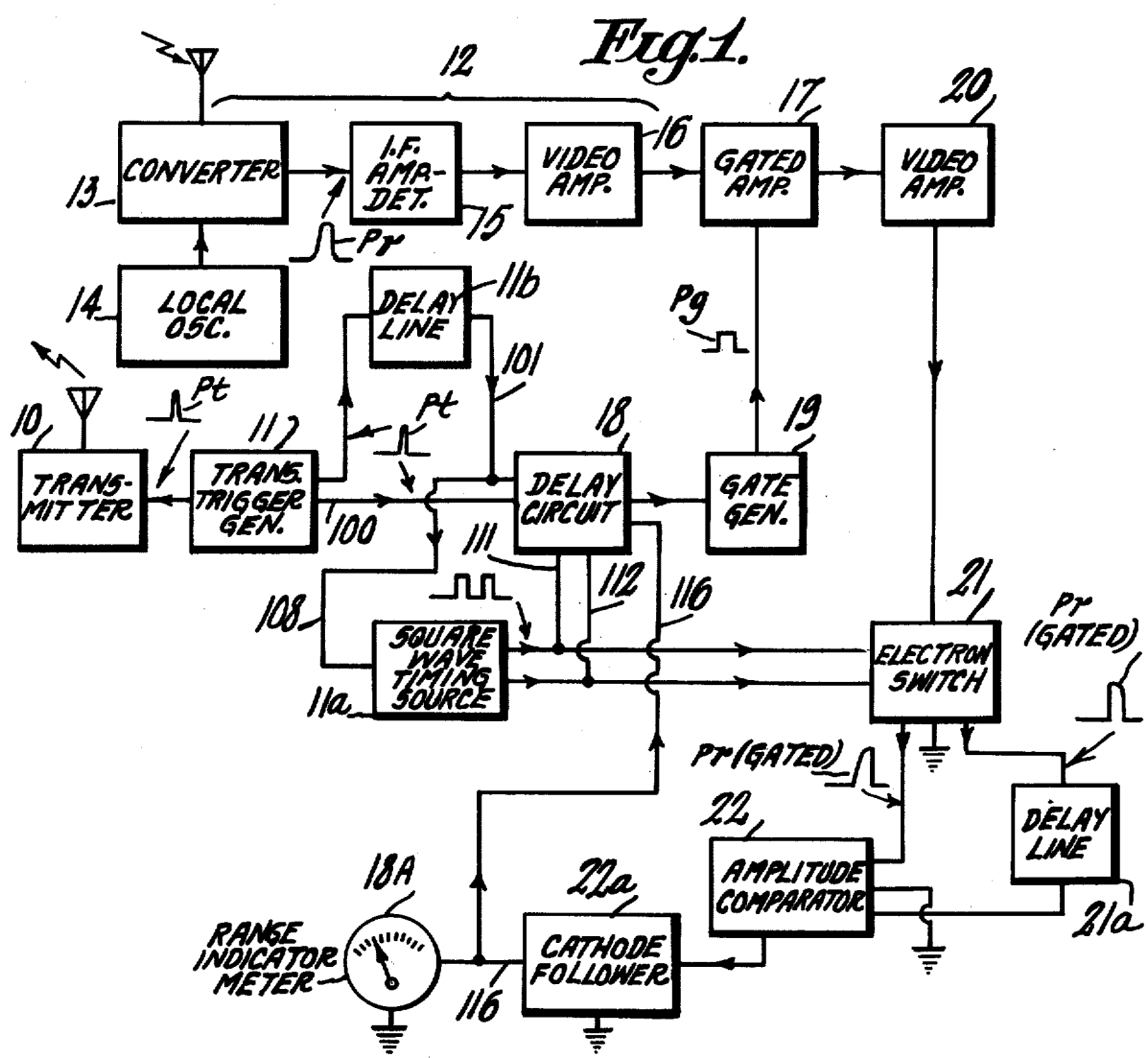
FIG. 1 is a block diagram of one embodiment of the invention as it may be applied to a range-finding system that includes an automatic tracking system.

In the pulse-echo system embodying the invention as illustrated in FIG. 1, a succession of pulses of high frequency radio energy are transmitted by the transmitter 10. The transmitter is triggered by the pulse Pt generated by the transmitter trigger generator 11 which has a pulse repetition rate hereinafter designated as F. As explained hereinafter, trigger generator 11 also controls a square wave timing source 11a that generates a square wave at half the repetition frequency (F) or F/2.

The transmitted pulses may be assumed to be reflected from a remote object or surface to the antenna of the receiver and subsequently passed to the receiver designated generally as 12. The receiver comprises a converter or mixer 13 and a local heterodyne oscillator 14. The received pulses are heterodyned to an intermediate frequency in the converter 13 and passed to the latter stages of the receiver, namely the IF amplifier and second detector indicated at 15 and thence to the video amplifier 16. The output of the video amplifier is applied to the gated amplifier 17 which is a component of the automatic tracking system hereinafter described in detail.

The means for measuring the elapsed time between a pulse transmission and its reflected reception, and accordingly for determining the distance to the reflecting object, comprises a delay circuit 18 (shown in detail in FIG. 3) to which is applied the pulse Pt of the transmitter trigger generator in both delayed and undelayed form, the delayed pulse Pt being obtained by means of a delay line 11b. The function of the delay circuit 18 is to introduce a measurable delay time which will permit the output of the delay circuit to be matched against the occurrence of any particular one of the received pulses, thus furnishing a basis for determining the time elapsed between the transmission of the pulse and the time of its return at the receiver. The time interval thus determined may, of course, be translated into a linear measurement corresponding to the distance between the system and the reflecting object or surface and indicated on a range indicator meter 18A. The output of the delay circuit 18 consists of early and late pulses, i.e., alternate pulses are delayed with respect to the others as described in connection with FIG. 3. The pulses from circuit 18 trigger a gating pulse generator 19. The gating pulses Pg thus produced by gate pulse generator 19 are applied to the gated amplifier 17. As the rate of repetition of the gating pulse Pg is determined by the output of the transmitter trigger generator 11, the gating pulses Pg will have the same repetition rate as the transmitted pulses P and the received pulses Pr. Accordingly, the gated amplifier 17 will be sensitized to the incoming video pulses supplied to it by the receiver as the successive received pulses Pr (see FIGS. 1 and 2) are reflected from an object at a distance which corresponds to the time delay introduced in the delay circuit 18.

According to the invention, the gating pulses Pg are employed to effect an early and late gating of a suitable gating circuit such as the gated amplifier 17 with respect to the peaks of the received pulses which, in conjunction with means for resolving the difference in amplitude of the early and late gated outputs of the gated amplifier 17, provides an exact measurement of the elapsed time of pulse propagation, as well as making it possible to follow variations in the elapsed time of propagation of pulses reflected from a particular object or surface as the object or surface moves relative to the receiver.

The early and late gating of the single channel receiver is accomplished by utilizing the voltage controlled delay circuit 18 in cooperation with the output of the square wave timing source 11a, which, as stated hereinbefore, has an output repetition rate of one-half that of the transmitter trigger generator 11.

Figure 2:
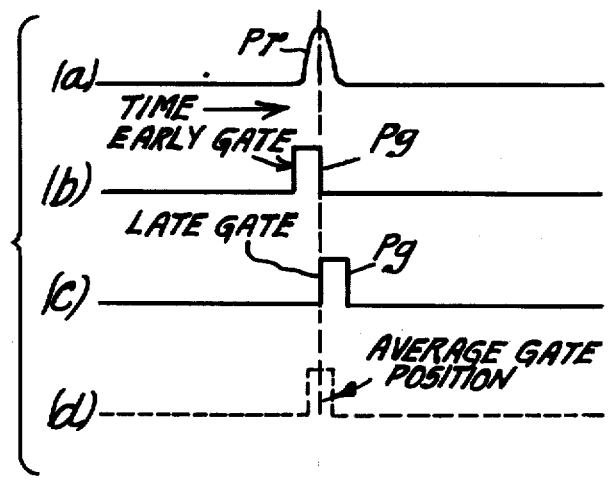
FIG. 2 is a set of graphs illustrating the relationship of time of occurrence of the gating pulse and the successive received pulses passed by the receiver.

The manner in which the square wave timing circuit 11a and the delay circuit 18 cooperate to form the early and late gating of the gated amplifier 17 will be better understood by reference to FIG. 2. In FIG. 2(a), Pr represents successive received pulses in the train of pulses reflected from a particular object or surface. The output of delay circuit 18, which controls the gate generator 19 and hence the timing of pulses Pg, operates on a d-c bias voltage supplied from an amplitude comparator 22 and a cathode follower 22a. The inputs to delay circuit 18 are the output pulses of trigger generator 11 applied at repetition frequency F and the output of the square wave timing source 11a applied at the repetition frequency of F/2. The output of the square wave timing circuit 11a switches the delay circuit as described hereinafter in connection with FIG. 3 so that it passes early and late gate pulses alternately, the early gate being positioned, for example, as shown at FIG. 2(b) and the late gate being positioned as shown at FIG. 2(c).

The d-c bias voltage of the delay circuit 18 is adjusted so that the average position of the late and early gates is centered with respect to the peaks of received pulses as indicated in FIG. 2(d). As the repetition rate of the square wave produced by the circuit 11a is one-half that of the pulse repetition rate of the received pulses, the gating pulse Pg will shift from the early to the late gate position alternately with the reception of successive pulses. Accordingly, the late gate will overlap the trailing side of the received pulse Pr and the early gate will overlap the leading side of the successive pulse Pr. In the instance the gates are centered with respect to the peak or center of the received pulse, the gated amplifier outputs corresponding to the early and late gates will be the same. If, however, the time of occurrence of the received pulse is varied as a result of the reflecting object moving toward or away from the system, one gate will overlap a larger portion of the received pulse than the other and the successive outputs of the gated amplifier will reflect a corresponding difference in amplitude. This difference in amplitude in successive outputs may be resolved to produce an error or control voltage signal which may be applied to the delay circuit to re-position the time of occurrence of the gating pulse Pg with respect to the received pulse. The control voltage necessary to re-position the circuit in a balanced condition is, of course, a function of the distance which the reflecting object has moved with respect to the receiver.

While the early and late gating pulses are illustrated in FIG. 2 as each being of substantially the same width as the received pulse and are shown with the late gating pulse displaced in time so that its leading edge substantially coincides with the trailing edge of the early gating pulse, it should be understood that this specific gating pulse arrangement is not necessary to obtain the circuit operation just described. For example, the gating pulses may be substantially wider than the received pulse, the important thing being the relative timing of the trailing and leading edge of the early and late gating pulses, respectively. Furthermore, the early and late gating pulses may overlap a certain amount but any such overlap preferably is less than the width of the received pulse. Also, if desired, the early and late gating pulses may be spaced so that the late gating pulse has its leading edge occurring after the trailing edge of the early gating pulse by some amount that preferably is no greater than the width of the received pulse. The various suitable adjustments in the relative timing of the early and late gating pulses will be apparent to those skilled in the art. As to the width of each gating pulse, the width should not be so great as to result in the selection of reflected pulses from more than one target.

Comparison of the amplitude of the signals passed through the single receiver channel as heretofore described may be accomplished by supplying the output of the gated amplifier 17 to a video amplifier 20 which in turn feeds into the electron switch 21. The electron switch 21 is controlled by the square wave timing circuit 11a having a pulse repetition rate equal to one-half that of the repetition rate of the received pulses. Accordingly, successive pulses are diverted into the alternate output channels by the electron switch 21. Since little gain is necessary at this stage, this switch may comprise highly degenerative amplifiers made very stable with respect to gain variation. One simple form of electron switch may consist of two vacuum tubes, each having a control grid and a screen grid, the tubes having a common input and separate outputs. The switching wave from source 11a may be applied to the screen grids of the two tubes so that they pass signal alternately. The pulses Pr thus diverted into the alternate output channels of the electronic switch 21 are supplied to an amplitude comparison circuit 22.

The comparison circuit 22 may be as shown in FIG. 4 and described hereinafter or it may comprise grid-leak biased amplifier tubes that function as peak rectifiers and which have their output circuits connected in balance relation. In the event the amplitude of the pulses Pr are equal, the direct current output of the circuit 22 will be zero. If the peak values of the incoming pulses are not equal, a d-c voltage will be developed which may be applied to the delay circuit 18 to readjust the time of occurrence of the gating pulse Pg with respect to the center or peak of the received pulses. In order to bring the two successive pulses Pr in coincidence in in time so that effective comparison may be accomplished in the circuit 22, a time delay network 21a may be incorporated into the output channel of the electron switch passing the early gated pulse.

FIG. 3 illustrates, by way of example, suitable circuits for the delay circuit 18, the square wave source 11a and the gate generator 19. These circuits and their operation will be described with reference to the graphs of FIG. 5.

The trigger pulse Pt undelayed, FIG. 5(c), and the trigger pulse Pt delayed, FIG. 5(d), are applied through leads 100 and 101, respectively, to the grids of a double triode 102 and also to diodes 103 and 104, respectively, which act as both clamping and switching diodes. The clamping diodes insure the proper bias level on the alternate trigger tube 102 as determined by the bias controls 106 and 107.

The half frequency source 11a is a conventional multivibrator that is triggered by delayed pulses Pt supplied over a lead 108. The outputs of 11a FIG. 5(e1) and FIG. 5(e2), are applied over leads 111 and 112 to the diodes 103 and 104 so that they alternately bias on the input of alternate trigger tube 102 whereby tube 102 passes first Pt undelayed and then Pt delayed to the delay multivibrator 113. The pulses thus applied to delay M.V. 113 are shown at (f) and (g), FIG. 5. The manner in which the switching circuit operates will be apparent by reference to FIG. 5 is it is remembered that when a positive wave is applied to either diode 103 or to diode 104 this positive wave is also applied to the associated grid of tube 102 and reduces the bias of the associated section of tube 102. In the absence of a positive wave on the anode of a diode, the associated section of tube 102 is biased beyond cut-off. When the switching voltage is negative on the anode of either diode 103 or 104, the input of its associated section of tube 102 is biased below cut-off to prevent passage of a pulse. Thus, referring to FIG. 5 (c) and FIG. 5 (e2), it will be seen that the first undelayed pulse Pt occurs while the switching wave (e2) is still in the positive direction. Thus, said first undelayed pulse Pt is passed as shown by FIG. 5 (f). During the occurrence of the first delayed pulse Pt shown at FIG. 5 (d), the other switching wave (e1) applied to diode 104 is negative so that said delayed pulse is not passed.

The second undelayed pulse Pt is not passed because at that time the switching wave (e2) is negative. The second delayed pulse Pt is passed as shown by FIG. (g) because during its occurrence the switching wave (e1) is positive.

The delay M.V. 113 is of the well known cathode coupled type although other types of delay multivibrators may be employed. The delay M.V. 113 produces an output pulse that is delayed by an amount D (FIG. 5) with respect to the instant of triggering that is a function of the d-c bias applied to the grid 114 by way of lead 116. This is shown by the graphs ($h$) and ($i$) of FIG. 5. It will be noted that the delayed pulses of graphs ($h$) and ($i$) are early and late, respectively, with respect to the received pulses $Pr$ by virtue of the delay introduced by the delay line 11b.

The output of delay M.V. 113 is applied over a lead 117 to the gate generator 19 which produces the early and late gating pulses $Pg$ is shown in graphs ($j$) and ($k$) of FIG. 5. These pulses appear at the cathode of a gas or vapor tube 118 and are supplied over a lead 119 to the gated amplifier 17.

The gate generator 19 is shown, by way of example, as comprising a pulse forming delay line 121 and the tube 118 for periodically discharging the line 121 thereby producing the pulses $Pg$ having a width or duration equal to the time of travel of a wave down the delay line 121 and back. Such circuits are well known and need not be described in further detail.

FIG. 4 shows an example of an amplitude comparator with pulse stretcher means that may be employed. The comparator 22 comprises two triodes 126 and 127 having cathode and anode output circuits connected in balanced relation so that if the successive pulses $Pr$ are of equal amplitude the output will be zero. It will be understood that the delay line 21a delays the pulses passed through it by an amount substantially equal to the repetition period of the received pulses $Pr$ so that the early and late gated pulses appear on the grids of tubes 126 and 127 simultaneously to make comparison possible.

The output of comparator 22 is zero if there is a balance condition; otherwise it is a plus or minus pulse. The output circuit of each comparator tube includes a blocking capacitor and also includes a filter for stretching or widening the pulse to effect better control. At the tube 126 the stretching filter comprises resistor 131 and capacitor 132; at the tube 127 it comprises the resistor 133 and capacitor 135.

The output voltage of comparator 22 may be applied to a cathode follower tube 134 having a filter 136, 137 in its output circuit whereby a d-c voltage appears on the lead 116 for biasing the delay M.V. 113.

The d-c bias voltage on lead 116 is measured by a d-c voltmeter 18A which is calibrated in distance to the reflecting target. The voltmeter 18A functions as a range indicator since, as previously explained, the amount of gate pulse delay provided by the M.V. 113 is a function of the bias applied to it.

The range delay adjustment may be made as follows:

The delay M.V. 113 may be biased so that for some midrange the range delay is correct when the output of the amplitude comparator 22 is zero. For any other range the comparator output is plus or minus thus supplying a correction bias voltage. A very small amount of this correction voltage will pull and hold the range delay M.V. 113 to the correct range delay for the particular target distance. The range indicator meter will read in accordance with this corrected bias voltage.

As the advantages of the instant invention are derived for the most part by subjecting the signals from which the correction voltage is to be derived to the same electrical channel and consequently to the same gain variations, it may be desirable to employ a type of receiver gating such as that described and claimed in U.S. application Ser. No. 140,482 filed Jan. 25, 1950, in which the gating is applied to the local oscillator.

There is thus disclosed an improved method of and apparatus for precision controlling an electrical system responsive to a succession of electrical energy pulses in which the energy is received and transmitted through a single channel and alternate energy pulses are early and late gated by delay and gate circuits, the amplitudes of the alternate energy pulses from the single channel being compared to produce an error or control voltage signal, which signal is applied to the delay circuit. Early and late gating is defined as the gating taking place respectively to overlap the leading side of one energy pulse and to overlap the trailing side of the next succeeding or preceding energy pulse.

What is claimed is:

1. A control circuit for electrical systems responsive to a succession of electrical pulses comprising a single channel through which said pulses are passed, said channel including a gating circuit, means for producing gating pulses that recur at the same repetition rate as said electrical pulses but which have alternate pulses starting late in the gating pulse repetition cycle whereby there are produced early gating pulses that have a repetition rate equal to one-half the repetition rate of said electrical pulses and the late gating pulses that have a repetition rate equal to one-half the repetition rate of said electrical pulses, means for applying said gating pulses to said gating circuit whereby said electrical pulses appear in the output circuit of said channel when said electrical pulses and said gating pulses occur simultaneously or overlap in time, means for obtaining a control voltage that is a function of the relative amplitudes of two successive output pulses from said channel, and means for shifting the phase of said gating pulses as a function of said control voltage and for holding said gating pulses in an overlapped time relation with respect to said electrical pulses, and means for producing an indication that is a function of the phasing of said gating pulses.

2. A pulse-echo distance determining system comprising means for transmitting a succession of pulses at a recurring frequency, means for receiving said pulses after reflection from a distant object, said receiving means consisting of a single channel that includes a gating circuit, means for producing gating pulses that recur at the same repetition rate as the received pulses but which have alternate pulses starting late in the gating pulse repetition cycle whereby there are produced early gating pulses that have a repetition rate equal to one-half the repetition rate of said received pulses and late gating pulses that have a repetition rate equal to one-half the repetition rate of said received pulses, means for applying said gating pulses to said gating circuit whereby received pulses reflected from said object appear in the output circuit of the receiving means when said received pulses and said gating pulses occur simultaneously or overlap in time, means for obtaining a control voltage that is a function of the relative amplitudes of two successive output pulses from the receiving means, and means for shifting the phase of said gating pulses as a function of said control voltage and for holding said gating pulses in an overlapped time relation with respect to the received pulses as the distance to said object changes, and means for producing an indication that is a function of the phasing of said gating pulses whereby distance to the reflecting object is indicated.

3. A pulse-echo distance determining system comprising means for transmitting a succession of pulses at a recurring frequency, means for receiving said pulses after reflection from a distant object, said receiving means consisting of a single channel that includes a gating circuit, means including a delay multivibrator for producing gating pulses that recur at the same repetition rate as the received pulses but which have alternate pulses starting late in the gating pulse repetition cycle whereby there are produced early gating pulses that have a repetition rate equal to one-half the repetition rate of said received pulses and late gating pulses that have a repetition rate equal to one-half the repetition rate of said received pulses, means for applying said gating pulses to said gating circuit whereby received pulses reflected from said object appear in the output circuit of the receiving means when said received pulses and said gating pulses occur simultaneously or overlap in time, means comprising an amplitude comparator for obtaining a control voltage that is a function of the relative amplitudes of two successive output pulses from the receiving means, and means for shifting the phase of said gating pulses as a function of said control voltage and for holding said gating pulses in an overlapped time relation with respect to the received pulses as the distance to said object changes, said last means including means for applying said control voltage to said delay multivibrator, and means for producing an indication that is a function of the phasing of said gating pulses whereby distance to the reflecting object is indicated.

4. The invention according to claim 3 wherein there is an electron switch having a common input to which the receiver output pulses are applied and having two output channels connected to the input circuit of the amplitude comparator, and wherein there is means for producing switching pulses recurring at half the repetition rate of the gating pulses, said switching pulses being applied to said electron switch so that said two channels alternately receive signal.

5. In a pulse-echo radar system wherein radio pulses of a certain repetition rate are transmitted toward a target and received after reflection from said target, said system comprising a receiver for receiving said reflected pulses, said receiver including means whereby signal is passed through the receiver only during the application of a gating pulse thereto, means for producing gating pulses having the same repetition period as said reflected pulses with alternate pulses each beginning at a certain time in said period and with the remaining pulses each beginning at a time in said period that is later than said certain time whereby there are produced early gating pulses that have a repetition rate equal to one-half the repetition rate of said reflected pulses and late gating pulses that have a repetition rate equal to one-half the repetition rate of said reflected pulses, means for applying said gating pulses to said receiver whereby the receiver output pulses have an amplitude that is a function of the time relation of the gating pulses and the received pulses, means for comparing the amplitude of two successive receiver output pulses and for producing a control voltage having a value that is a function of the relative amplitudes of said two successive pulses, and means for shifting the phase of the gating pulses as a function of said control voltage and for holding the gating pulses in such phase relation to the received pulses from said target as to cause said receiver to pass said received pulses, and means for producing an indication that is a function of the phase of the gating pulses whereby distance to the target is indicated.

6. In a pulse-echo radar system wherein radio pulses of a certain repetition rate are transmitted toward a target and received after reflection from said target, said system comprising a receiver for receiving said reflected pulses, said receiver including means whereby signal is passed through the receiver only during the application of a gating pulse thereto, means for producing gating pulses having the same repetition rate as said transmitted pulses and having a definite time relation with respect to said transmitted pulses with alternate gating pulses each beginning at a certain time in the gating pulse repetition period and with the remaining pulses each beginning at a time in said period that is later than said certain time whereby there are produced early gating pulses that have a repetition rate equal to one-half the repetition rate of said transmitted pulses and late gating pulses that have a repetition rate equal to one-half the repetition rate of said transmitted pulses, means for applying said gating pulses to said receiver to gate it whereby the receiver output pulses have an amplitude that is a function of the time relation of the gating pulses and the received pulses, means for comparing the amplitude of two successive receiver output pulses and for producing a control voltage having a value that is a function of the relative amplitudes or energy contents of said two successive pulses, and means for shifting the phase of the gating pulses as a function of said control voltage and for holding the gating pulses in such phase relation to the received pulses from said target as to cause said receiver to pass said received pulses, and means for producing an indication that is a function of the phase of the gating pulses whereby distance to the target is indicated.

7. In a pulse-echo radar system wherein radio pulses of a certain repetition rate are transmitted toward a target and received after reflection from said target, said system comprising a receiver having a single signal channel for receiving and amplifying said reflected pulses, said receiver including means which may be gated so that signal is passed through the receiver only during the application of a gating pulse thereto, means for producing early and late gating pulses, each having a repetition rate equal to one-half that of said reflected pulses, means for applying said gating pulses to said first means whereby pulses appear in said signal channel at a point following said first means, said last-named pulses have an amplitude that is a function of the time relation of the gating pulses and the received pulses, single channel amplifier means for further amplifying said last-named pulses to provide amplified output pulses, means for comparing the amplitude of two successive amplified output phases and for producing a control voltage having a value that is a function of the relative amplitudes or energy contents of said two successive pulses, and means for shifting the phase of the gating pulses as a function of said control voltage and for holding the gating pulses in such phase relation to the received pulses from said target as to cause said receiver to pass said received pulses, and means for producing an indication that is a function of the phase of the gating pulses whereby distance to the target is indicated.

* * * * *